United States Patent
Mizutaki

(10) Patent No.: US 9,109,327 B2
(45) Date of Patent: Aug. 18, 2015

(54) BLACK INK FOR INK JET TEXTILE PRINTING AND TEXTILE PRINTING METHOD

(71) Applicant: Seiko Epson Corporation, Tokyo (JP)

(72) Inventor: Yusuke Mizutaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/200,728

(22) Filed: Mar. 7, 2014

(65) Prior Publication Data

US 2014/0267514 A1 Sep. 18, 2014

(30) Foreign Application Priority Data

Mar. 14, 2013 (JP) .................. 2013-051376

(51) Int. Cl.
| | |
|---|---|
| *C09D 11/328* | (2014.01) |
| *B41J 2/01* | (2006.01) |
| *B41J 3/407* | (2006.01) |
| *D06P 3/54* | (2006.01) |
| *D06P 5/30* | (2006.01) |
| *C09D 11/00* | (2014.01) |
| *C09D 11/30* | (2014.01) |
| *C09D 11/32* | (2014.01) |

(52) U.S. Cl.
CPC ... *D06P 5/30* (2013.01); *B41J 2/01* (2013.01); *C09D 11/00* (2013.01); *C09D 11/30* (2013.01); *C09D 11/32* (2013.01); *D06P 3/54* (2013.01); *B41J 3/4078* (2013.01)

(58) Field of Classification Search
CPC ........ C09D 11/328; B41J 2/01; B41J 3/4078; D06P 3/54; D06P 5/30
USPC ............ 106/31.44, 31.45, 31.49, 31.5, 31.51; 347/100
See application file for complete search history.

(56) References Cited

U.S. PATENT DOCUMENTS

| | | | | |
|---|---|---|---|---|
| 4,689,078 | A * | 8/1987 | Koike et al. ................. | 106/31.33 |
| 5,382,561 | A * | 1/1995 | Mori et al. .................... | 503/227 |
| 5,910,812 | A * | 6/1999 | Yamamoto et al. ........... | 347/106 |
| 2008/0070009 | A1* | 3/2008 | Akatani et al. ............. | 428/195.1 |
| 2008/0193648 | A1* | 8/2008 | Becker et al. ................. | 427/288 |
| 2009/0136678 | A1* | 5/2009 | Nakamura et al. ............ | 427/500 |
| 2011/0292114 | A1 | 12/2011 | Sao et al. | |

FOREIGN PATENT DOCUMENTS

| | | |
|---|---|---|
| EP | 2 390 288 A1 | 11/2011 |
| JP | 2000-239980 A | 9/2000 |
| JP | 2005-263836 A | 9/2005 |
| JP | 2010-065177 A | 3/2010 |

* cited by examiner

*Primary Examiner* — Helene Klemanski
(74) *Attorney, Agent, or Firm* — Nutter McClennen & Fish LLP; John J. Penny, Jr.

(57) ABSTRACT

There is provided a black ink for ink jet textile printing which includes a disperse dye (A), a disperse dye (B), a disperse dye (C), water, and an organic solvent. The disperse dye (A) is at least one of C.I. Disperse Blue 60 and C.I. Disperse Blue 165, the disperse dye (B) is at least one of C.I. Disperse Red 92, and C.I. Disperse Red 154, and the disperse dye (C) is C.I. Disperse Yellow 163.

14 Claims, No Drawings

BLACK INK FOR INK JET TEXTILE PRINTING AND TEXTILE PRINTING METHOD

BACKGROUND

1. Technical Field

The present invention relates to a black ink for ink jet textile printing and a textile printing method using the same.

2. Related Art

An ink jet recording method is a recording method in which recording is performed by discharging small droplets of ink from fine nozzle heads to be flown and by adhering small droplets of ink on a recording medium such as paper. The method has a feature that images with a high-resolution and a high-quality at a high speed using a relatively inexpensive apparatus can be recorded.

In recent years, a method which prints on a cloth which is a recording medium using an ink jet printing technique has been proposed. In the case where the cloth is subjected to textile printing, it is necessary to select a colorant depending on the type of the cloth, an ink including a disperse dye is used for the cloth such as polyester fiber, and an ink with an excellent light resistance and coloring property for the ink jet textile printing has been proposed (JP-A-2010-65177 and JPA-2000-239980).

However, in the black ink described in JPA-2010-65177, there are some cases where a poor reservation of white area occurs when reduction-cleaning a printed material. The "poor reservation of white area" is a phenomenon in which a dye flowing out to a cleaning solution from the cloth is re-adsorbed in an area other than a printing pattern, and thus, dyeing inadvertently occurs in a cleaning step of the printed material. The "poor reservation of white area" is also called a poor white area.

In addition, in the black ink disclosed in JP-A-2000-239980, there is a case where a sufficient light resistance cannot be obtained.

Therefore, it can be considered that a black ink for ink jet textile printing which can suppress the poor reservation of white area and has an excellent light resistance is still required.

SUMMARY

The invention can be realized in the following forms or application examples.

Application Example 1

A black ink for ink jet textile printing according to this application example includes a disperse dye (A), a disperse dye (B), a disperse dye (C), water and an organic solvent. The disperse dye (A) is at least one of C.I. Disperse Blue 60 and C.I. Disperse Blue 165, the disperse dye (B) is at least one of C.I. Disperse Red 92 and C.I. Disperse Red 154, and the disperse dye (C) is C.I. Disperse Yellow 163.

In this case, the disperse dye (A), the disperse dye (B), and the disperse dye (C) contained in the black ink for ink jet textile printing have an excellent light resistance and are likely to be decomposed by a reducing agent. Thus, it is possible to obtain a black ink which can suppress a poor reservation of white area during a reduction cleaning, and has an excellent light resistance.

Application Example 2

In the black ink for ink jet textile printing according to the application example, a content ratio of the C.I. Disperse Red 92 with respect to a content of the disperse dye (B) is 0.6 or greater on a mass basis.

In this case, the black ink for ink jet textile printing includes C.I. Disperse Red 92 of 0.6 or greater on a mass basis with respect to the content of the disperse dye (B). The C.I. Disperse Red 92 of an anthraquinone skeleton has more excellent light resistance than C.I. Disperse Red 154 of an azo skeleton does. In this manner, the light resistance of the black ink for ink jet textile printing is further improved.

Application Example 3

In the black ink for ink jet textile printing according to the application example, a content ratio of the C.I. Disperse Blue 60 with respect to a content of the disperse dye (A) is 0.6 or greater on a mass basis.

In this case, the black ink for ink jet textile printing includes C.I. Disperse Blue 60 of 0.6 or greater on a mass basis with respect to the content of the disperse dye (A). Since the C.I. Disperse Blue 60 of the anthraquinone skeleton has more excellent light resistance than C.I. Disperse Blue 165 of the azo skeleton does, the light resistance of the black ink for ink jet textile printing is further improved.

Application Example 4

In the black ink for ink jet textile printing according to the application example, the content ratio of the disperse dye (A) with respect to a content of the disperse dye (C) is in the range of 0.5 to 3.0 on a mass basis, and the content ratio of the disperse dye (B) with respect to the content of the disperse dye (C) is in the range of 1.0 to 3.0 on a mass basis.

In this case, the black ink for ink jet textile printing having a black color of which color is low (color saturation is low) can be obtained.

Application Example 5

In the black ink for ink jet textile printing according to the application example, the content ratio of the disperse dye (A) with respect to the content of the disperse dye (B) is in the range of 0.3 to 1.5 on a mass basis.

In this case, the black ink for ink jet textile printing having the black color of which color is low in clearity (color saturation is low) can be obtained.

Application Example 6

In the black ink for ink jet textile printing according to the application example, a total content of the disperse dye (A), the disperse dye (B) and the disperse dye (C) is in the range of 1.5% by mass to 7.0% by mass.

In this case, it is possible to obtain the black ink for ink jet textile printing as the black ink which can suppress the poor reservation of white area during the reduction cleaning, and has an excellent light resistance.

Application Example 7

In a textile printing method according to this application example, a textile printed material is obtained by applying the black ink for ink jet textile printing according to the application example to a cloth.

In this case, since the cloth is printed by the black ink which can suppress the poor reservation of white area during reduction cleaning, and has an excellent light resistance, it is possible to obtain a textile printed material in which dyeing does not inadvertently occur, and which has more excellent light resistance.

Application Example 8

In the textile printing method according to the application example, discharging the black ink for ink jet textile printing according to the application example to apply the ink to the cloth using an ink jet recording apparatus is provided.

In this case, since there is provided the ink jet recording apparatus to apply the black ink for ink jet textile printing which can suppress the poor reservation of white area during the reduction cleaning, and which has an excellent light resistance, as the black ink, to the cloth, it is possible to obtain the textile printed material in which dyeing does not inadvertently occur, and which has more excellent light resistance.

Application Example 9

In the textile printing method according to the application example, applying a pretreatment agent to the cloth prior to applying the ink thereto, heat-treating the cloth after applying the ink thereto, and cleaning the heat-treated cloth are provided.

In this case, the ink is applied after applying the pretreatment agent to the cloth, and then, the heat treatment is performed. Since the disperse dye is excellently dyed to fiber by the textile printing method, it is possible to more easily obtain the effect of the black ink for ink jet textile printing of the invention.

DESCRIPTION OF EXEMPLARY EMBODIMENTS

Next, the exemplary embodiments of the invention will be described. The following exemplary embodiments are intended to facilitate the understanding of the invention and are not intended to limit the invention. The invention may be appropriately modified without departing from the scope of the invention.

1. Black Ink for Ink Jet Textile Printing

A black ink for ink jet textile printing according to the embodiment (hereinafter, also simply referred to as "ink" or black ink") includes a disperse dye, a dispersant, water as a solvent and a water-soluble organic solvent. Hereinafter, the disperse dye, the dispersant, water, the water-soluble organic solvent and other additives which are included in the black ink for ink jet textile printing according to the embodiment will be described in this order.

1.1 Disperse Dye

The disperse dye which is included in the ink of the invention includes a disperse dye (A), a disperse dye (B) and a disperse dye (C).

The disperse dye (A) is at least one of C.I. Disperse Blue 60 and C.I. Disperse Blue 165, and between them, C.I. Disperse Blue 60 is preferable. In more detail, since when a content ratio of the C.I. Disperse Blue 60 with respect to a content of the disperse dye (A) is 0.6 or greater on a mass basis, light resistance is excellent, it is preferable.

The disperse dye (B) is at least one of C.I. Disperse Red 92 and C.I. Disperse Red 154, and between them, C.I. Disperse Red 92 is preferable. In more detail, since when a content ratio of the C.I. Disperse Red 92 with respect to a content of the disperse dye (B) is 0.6 or greater on a mass basis, the light resistance is excellent, it is preferable.

The disperse dye (C) of the invention is C.I. Disperse Yellow 163.

When the ink includes the disperse dye (A), the disperse dye (B) and the disperse dye (C), it is possible to obtain a textile printed material which can suppress a poor reservation of white area, and which has an excellent light resistance.

The content of the disperse dye in the ink of the invention, which is not particularly limited, is in the range of 0.01% by mass to 10% by mass, preferably in the range of 0.5% by mass to 8% by mass, and more preferably in the range of 1.5% by mass to 7.0% by mass. When the content is in the above range, it is possible to obtain the textile printed material having a sufficient color forming density.

In addition, the contents of the disperse dye (A), the disperse dye (B) and the disperse dye (C) are not particularly limited as long as a color as the black ink is obtained. For example, when it is desirable to obtain a black ink of which color is low in clearity (color saturation C* defined in CIE-LAB color space is low), the content of each disperse dye may be appropriately set, and if it is within the color described above, a bluish black, a reddish black and a yellowish black may be selected according to the demand of a user.

When it is desirable to set a black having a color of more achromatic color (for example, color saturation C* is 15 or less), the content ratio of the disperse dye (A) with respect to a content of the disperse dye (C) is preferably set to the range of 0.5 to 3.0 on a mass basis, and the content ratio of the disperse dye (B) with respect to the content of the disperse dye (C) is preferably set to the range of 1.0 to 3.0 on a mass basis.

Furthermore, in addition to the conditions described above, when the content ratio of the disperse dye (A) with respect to the disperse dye (B) is in the range of 0.3 to 1.5 on a mass basis, a black ink of which color is lower in clearity (color saturation C* is low) can be obtained.

1.2 Dispersant

Examples of the dispersant for dispersing the disperse dye, which are not particularly limited, can include a nonionic dispersant and an anionic dispersant. Examples of the anionic dispersant include high fatty acid salts, polyoxyethylene alkyl ether sulfates, aromatic sulfonates, lignin sulfonates and formalin condensates such as aromatic sulfonates or lignin sulfonates. Examples of the aromatic sulfonate include alkyl phenyl sulfonates, alkyl naphthalene sulfonates and alkyl phenyl ether sulfonates. Examples of the formalin condensate of the aromatic sulfonate include formalin condensate of naphthalene sulfonate, formalin condensate of special aromatic sulfonate (formalin condensate of sodium alkylnaphthalene sulphonate such as butyl naphthalene and sodium naphthalene sulfonate), formalin condensate of sodium cresol sulfonate and sodium 2-naphthol-6-sulfonate, formalin condensate of sodium cresol sulfonate, and formalin condensate of sodium creosote oil sulfonate. In addition, these dispersants can be used singly or in a combination of two or more types.

Furthermore, all polymer dispersants can be used in addition to the nonionic and the anionic dispersants described above, and block copolymers, random copolymers, graft copolymers and salts thereof consisting of at least two or more monomers (among these, at least one is a hydrophilic monomer) selected from styrene and derivatives thereof, vinyl naphthalene and derivatives thereof, aliphatic alcohol esters of α,β-unsaturated carboxylic acids, acrylic acid and derivatives thereof, maleic acid and derivatives thereof, itaconic acid and derivatives thereof, fumaric acid and derivatives thereof, vinyl acetate, vinyl alcohol, vinyl pyrrolidone, acrylamide and derivatives thereof are exemplified. These resins preferably are alkali soluble resins which are soluble in an aqueous solution in which a base is dissolved.

A content of the dispersant included in the ink of the invention, which is not particularly limited, is preferably in the range of 5% by mass to 200% by mass, and more preferably in the range of 10% by mass to 100% mass with respect to the total content of the disperse dye.

Examples of a dispersing method, which are not particularly limited, can include a ball mill method, a sand mill method and a high pressure homogenizer method. In the invention, the range of an average particle diameter of the disperse dye which is contained in the black ink for ink jet textile printing is preferably in the range of 0.05 μm or greater to 1.0 μm or less, and more preferably in the range of 0.07 μm or greater to 0.5 μm or less from the viewpoint of a dispersion stability, and prevention of clogging of an ink supply system and of the ink discharging part.

1-3. Water

The ink of the invention includes water as a dispersion medium of the disperse dye. The content of water in the ink, which is not particularly limited, is preferably in the range of 40% by mass or greater to 90% by mass or less, more preferably in the range of 55% by mass or greater to 70% by mass or less.

1.4 Water-Soluble Organic Solvent

The ink of the invention includes the water-soluble organic solvent having the solubility of 1 g/100 g or greater with respect to water of 100 g at 25° C. Examples of the water-soluble organic solvent can include alcohols such as methanol, ethanol and isopropyl alcohol; ketones or ketoalcohols such as acetone and diacetone alcohol; ethers such as tetrahydrofuran and dioxane; glycols such as ethylene glycol, diethylene glycol, triethylene glycol, polyethylene glycol, propylene glycol, dipropylene glycol, tripropylene glycol, polypropylene glycol, propanediol, butanediol, pentanediol and hexylene glycol; lower alkyl ethers of glycols such as ethylene glycol monomethyl ether, diethylene glycol monomethyl ether, diethylene glycol monoethyl ether and diethylene glycol monobutyl ether; amines having a hydroxyl group such as diethanolamine and triethanolamine; glycerin, 2-pyrrolidone and N-methylpyrrolidone. Among these, glycerin, diethylene glycol, ethylene glycol, ethylene glycol monomethyl ether, diethylene glycol monobutyl ether or triethylene glycol monomethyl ether, triethylene glycol monobutyl ether are preferable, and these can be suitably used. Furthermore, among these, ethylene glycol is preferable. In addition, these water-soluble organic solvents can be used singly or in a combination of two or more types.

For example, the content of the water-soluble organic solvent in ink is preferably in a range of 5% by mass to 50% by mass from the viewpoints of prevention of the clogging of the nozzle and the bleeding.

1-5. Other Additives

In addition, according to the preferred embodiment of the invention, the ink of the invention can include, a surface tension adjuster, a preservative, a fungicide, a pH adjusting agent, a dye dissolution auxiliary agent, an antioxidant, an anti-foaming agent, a conductivity adjuster, a deep dyeing agent, a level dyeing agent and a penetrating agent as other additives in order to improve the properties thereof.

The ink of the present may include the surface tension adjuster. And examples of the surface tension adjuster include anionic surfactants, ampholytic surfactants, cationic surfactants and non-ionic surfactants.

Examples of the anionic surfactant include alkyl sulfocarboxylate, polyoxyethylene alkyl ether acetates, N-acylamino acid salt, alkyl sulfate polyoxyethylene alkyl ether sulfate, alkyl sulfate polyoxyethylene alkyl ether phosphate, sulfate esters of castor oil, lauryl alcohol sulfate ester, alkylphenol type phosphate ester, alkyl type phosphate ester, diethyl sulfosuccinate, diethylhexyl sulfosuccinate and dioctyl sulfosuccinate.

Examples of the amphoteric surfactant include lauryl dimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine and other imidazoline derivatives thereof.

Examples of the cationic surfactant include 2-vinyl pyridine derivative, poly 4-vinyl pyridine derivatives.

Examples of the nonionic surfactant include ether-based surfactants such as polyoxyethylene nonylphenyl ether, polyoxyethylene octyl phenyl ether, polyoxyethylene dodecyl phenyl ether, polyoxyethylene oleyl ether, polyoxyethylene lauryl ether and polyoxyethylene alkyl ether; ester-based surfactants such as polyoxyethylene oleic acid ester, polyoxyethylene distearate, sorbitan laurate, sorbitan monostearate, sorbitan monooleate, sorbitan sesquioleate, polyoxyethylene monooleate and polyoxyethylene stearate; acetylene glycol (alcohol)-based surfactants such as 2,4,7,9-tetramethyl-5-decyne-4,7-diol, 3,6-dimethyl-4-octyne-3,6-diol and 3,5-dimethyl-1-hexyne-3-ol.

Preferable examples of the preservative and the fungicide include sodium benzoate, sodium pentachlorophenol, sodium 2-pyridinethiol-1-oxide, sodium sorbate, sodium dehydroacetate, 1,2-dibenzine thiazoline-3-one (Proxel CRL, Proxel BDN, Proxel GXL, Proxel XL-2, and Proxel TN and Proxel LV manufactured by Zeneca Co., Ltd.), 4-chloro-3-methylphenol (Preventol CMK manufactured by BAYER).

In addition, examples of the pH adjusting agent, the dye dissolution auxiliary agent, the antioxidant, anti-foaming agent include amines such as diethanolamine, triethanolamine, propanolamine and morpholine, and modified products thereof, inorganic salts such as potassium hydroxide, sodium hydroxide and lithium hydroxide, ammonium hydroxide, quaternary ammonium hydroxide (tetramethylammonium and the like), carbonates such as potassium carbonate, sodium carbonate, lithium carbonate, and other phosphates, or ureas such as N-methyl-2-pyrrolidone, urea, thiourea and tetramethylurea, silicone emulsion and silicone compound.

Furthermore, examples of the deep dyeing agent, the level dyeing agent the penetrating agent include a aqueous urethane resin, fatty acid alcohol, polyethylene glycol, a non-ionic surfactant, an anionic surfactant, inorganic salts of monovalent and divalent (potassium chloride, sodium chloride, lithium chloride, magnesium chloride, potassium sulfate, sodium sulfate, lithium sulfate and magnesium sulfate).

2. Ink Jet Textile Printing Method 2.1 Cloth

A material constituting the cloth used in the textile printing method according to the invention is not particularly limited as long as a fiber which can be dyed with a disperse dye is contained. Among these, the material containing fiber such as polyester, acetate, triacetate and polyamide can be exemplified, and blended fibers such as polyurethane fiber may be used. Among these, since dyeing is easy, the cloth contain at least polyester fiber is preferable.

As the cloth, the fiber described above may be any form of a woven fabric, a knitting fabric and a non-woven fabric. In addition, as the cloth which can be used in the invention, in addition to the cloth in which fiber which can be dyed with the disperse dye is 100%, woven fabrics or non-woven fabrics such as rayon, cotton, polyurethane, acrylic, nylon, wool and silk can be also used as the cloth for textile printing. The thickness of the yarn constituting the above-described cloth is preferably in the range of 10d to 100d.

2.2 Ink Applying Step

In the textile printing method of the invention, an ink applying step in which ink droplets which are discharged by the ink jet recording method are adhered on the cloth is provided. As the ink jet recording method, any method may be used. Examples of the ink jet recording method include a charge deflection method, a continuous method, an on demand method (piezo type and bubble jet (registered trademark) type). As the textile printing method of the invention, the ink jet recording apparatus of the piezo type is particularly preferably used.

2-3. Other Steps

The textile printing method of the invention is preferably performed as follows. A pretreatment of the cloth in which fiber which can be dyed with the disperse dye is included is performed (pretreatment agent applying step), an image is formed by the ink jet recording method using the ink having the constitution described above (ink applying step), the cloth to which ink is applied is heat-treated (heat treatment step), and the cloth which is heat-treated is cleaned (cleaning step). It is possible to easily obtain the effect of the black ink of the invention. Hereinafter, the pretreatment agent applying step, the heat treatment step and the cleaning step will be described.

2-3-1. Pretreatment Agent Applying Step

In the ink jet textile printing method according to the invention, the pretreatment agent applying step in which a pretreatment agent is applied to the cloth prior to the ink applying step. For example, the pretreatment agents including a water-soluble polymer (paste), a cationic substance and a water repellent agent can be applied to the cloth for the purpose of preventing bleeding and promoting penetration of the ink to the cloth. In addition, the pretreatment agents including the surface tension adjuster and the water-soluble organic solvent can be applied to the cloth for the purpose of penetrating the ink to the surface opposite to the surface to which the ink is applied.

Examples of the cationic material include a water-soluble metal salt, a polycationic compound and the like. As the water-soluble metal salt, inorganic salts of alkali metal or alkali earth metal such as KCl, $CaCl_2$, organic acid salts can be used. As the polycationic compound, polymers or oligomers of various quaternary ammonium salts, and polyamine salts can be used.

As the natural water-soluble polymer which is one of water-soluble polymers, starch such as corn, wheat and the like, cellulose derivatives such as carboxymethyl cellulose, methyl cellulose and hydroxyethyl cellulose, polysaccharides such as sodium alginate, guar gum, tamarind gum, locust bean gum, arabic rubber and the like, proteins such as gelatin, casein, keratin and the like, and the synthetic water-soluble polymer, polyvinyl alcohol, polyvinylpyrrolidone, acrylic acid-based polymer and the like can be used.

The surface tension modifier is the same as the surface tension modifier which can be used in the ink of the invention described above. In addition, examples of the water repellent agent include silicone-based water repellent agents, fluorine-based water repellent agents and wax-based water repellent agents.

In the textile printing method of the invention, the pretreatment agents are appropriately selected according to an ink, a material, a cloth structure and a pad method, a coating method and a spray method are preferably used to apply the pretreatment agent such that 0.2% by mass to 50% by mass is contained in the cloth.

2-3-2. Heat Treatment Step

In the ink jet textile printing method according to the invention, the heat treatment step in which the cloth to which ink is applied is heat-treated may be provided. Since the disperse dye is excellently dyed to fiber by the heat treatment step, it is possible to easily obtain the effect by the black ink of the invention. As the heat treatment step, known methods in the related art can be used. Examples of the methods include a HT method (high temperature steaming method), a HP method (high pressure steaming method) and a thermosol method.

2-3-3. Cleaning Step

In the ink jet textile printing method according to the invention, the cleaning step in which the cloth to which ink is applied is cleaned may be provided. The cleaning step is preferably performed after the heat treatment step, and it is possible to effectively remove the disperse dye which is not dyed to the fiber. In the cleaning step, which is not particularly limited, reduction cleaning is preferably used from the viewpoint of suppressing the poor reservation of white area. For example, the reduction cleaning is preferably performed by applying sodium hydrosulfite in hot alkali in the range of 40° C. or higher to 100° C. or lower.

EXAMPLES

Hereinafter, the embodiments of the invention will be further specifically described with reference to examples, but the embodiments are not limited to the examples. According to the compositions shown in Tables 1 to 3, respective components described below were stirred to mix, and the resultant was filtered with a membrane filter having a pore size of 5.0 μm, whereby a black ink for ink jet textile printing was prepared. The numerical values in Table represent mass %.

Material

DB60 (C.I. Disperse Blue 60)
DB165 (C.I. Disperse Blue 165)
DR74 (C.I. Disperse Red 74)
DR92 (C.I. Disperse Red 92)
DR154 (C.I. Disperse Red 154)
DR191 (C.I. Disperse Red 191)
DY114 (C.I. Disperse Yellow 114)
DY163 (C.I. Disperse Yellow 163)
DO80 (C.I. Disperse Orange 80)
Dispersant (Joncryl 63, manufactured by BASF, aqueous acrylic resin, 30% resin solid)
TEG (triethylene glycol)
MTG (triethylene glycol monobutyl ether)
Glycerin
TEA (triethanolamine)
PELEX SSH (manufactured by Kao Corporation)

TABLE 1

|  |  | Example 1 | Example 2 | Example 3 | Example 4 | Example 5 | Example 6 | Example 7 | Example 8 | Example 9 |
| --- | --- | --- | --- | --- | --- | --- | --- | --- | --- | --- |
| Dye A | DB60 | 2.14 | 2.10 | 2.44 | 2.55 |  |  |  | 1.69 | 1.69 |
|  | DB165 |  |  |  |  | 0.49 | 0.38 | 0.60 |  |  |
| Dye B | DR154 |  |  |  |  | 0.70 |  |  | 0.80 | 0.20 |
|  | DR92 | 1.50 | 2.00 | 2.38 | 2.00 |  | 1.60 | 0.85 |  | 0.85 |
| Dye C | DY163 | 0.82 | 0.82 | 0.82 | 0.82 | 0.88 | 0.88 | 0.88 | 0.80 | 0.80 |
| Dispersant |  | 8.90 | 9.83 | 11.27 | 10.73 | 4.14 | 5.73 | 4.67 | 6.57 | 7.07 |
| TEG |  | 3 | 3 | 3 | 3 | 3 | 3 | 3 | 3 | 3 |
| MTG |  | 3 | 3 | 3 | 3 | 3 | 3 | 3 | 3 | 3 |
| Glycerin |  | 31 | 31 | 31 | 31 | 31 | 31 | 31 | 31 | 31 |
| TEA |  | 0.4 | 0.4 | 0.4 | 0.4 | 0.4 | 0.4 | 0.4 | 0.4 | 0.4 |
| PELEX SSH |  | 1.6 | 1.6 | 1.6 | 1.6 | 1.6 | 1.6 | 1.6 | 1.6 | 1.6 |
| Pure water |  | Balance | Balance | Balance | Balance | Balance | Balance | Balance | Balance | Balance |
| Total |  | 100 | 100 | 100 | 100 | 100 | 100 | 100 | 100 | 100 |
| Content ratio of dye A with respect to dye C (A/C) |  | 2.62 | 2.57 | 2.98 | 3.12 | 0.56 | 0.43 | 0.68 | 2.11 | 2.11 |
| Content ratio of dye B with respect to dye C (B/C) |  | 1.83 | 2.45 | 2.91 | 2.45 | 0.80 | 1.81 | 0.96 | 1.00 | 1.31 |
| Content ratio of dye A with respect to dye B (A/B) |  | 1.43 | 1.05 | 1.03 | 1.28 | 0.70 | 0.24 | 0.71 | 2.11 | 1.61 |
| Content ratio of DB60 in dye A |  | 1.00 | 1.00 | 1.00 | 1.00 | 0.00 | 0.00 | 0.00 | 1.00 | 1.00 |
| Content ratio of DR92 in dye B |  | 1.00 | 1.00 | 1.00 | 1.00 | 0.00 | 1.00 | 1.00 | 0.00 | 0.81 |

TABLE 2

|  |  | Example 10 | Example 11 | Example 12 | Example 13 | Example 14 | Example 15 | Example 16 | Example 17 |
| --- | --- | --- | --- | --- | --- | --- | --- | --- | --- |
| Dye A | DB60 | 1.69 | 1.69 | 1.81 | 0.84 | 0.37 | 0.27 | 0.85 | 0.27 |
|  | DB165 |  |  | 0.15 | 0.16 | 0.20 | 0.20 | 0.24 | 0.20 |
| Dye B | DR154 | 0.35 | 0.45 |  |  |  |  | 0.35 | 0.45 |
|  | DR92 | 0.65 | 0.60 | 1.25 | 1.53 | 1.60 | 1.60 | 0.65 | 0.60 |
| Dye C | DY163 | 0.80 | 0.80 | 0.82 | 0.49 | 0.63 | 0.63 | 0.88 | 0.88 |
| Dispersant |  | 6.97 | 7.07 | 0.87 | 6.03 | 5.60 | 5.40 | 5.93 | 4.80 |
| TEG |  | 3 | 3 | 3 | 3 | 3 | 3 | 3 | 3 |
| MTG |  | 3 | 3 | 3 | 3 | 3 | 3 | 3 | 3 |
| Glycerin |  | 31 | 31 | 31 | 31 | 31 | 31 | 31 | 31 |
| TEA |  | 0.4 | 0.4 | 0.4 | 0.4 | 0.4 | 0.4 | 0.4 | 0.4 |
| PELEX SSH |  | 1.6 | 1.6 | 1.6 | 1.6 | 1.6 | 1.6 | 1.6 | 1.6 |
| Pure water |  | Balance | Balance | Balance | Balance | Balance | Balance | Balance | Balance |
| Total |  | 100 | 100 | 100 | 100 | 100 | 100 | 100 | 100 |
| Content ratio of dye A with respect to dye C (A/C) |  | 2.11 | 2.11 | 2.40 | 2.02 | 0.91 | 0.75 | 1.24 | 0.53 |
| Content ratio of dye B with respect to dye C (B/C) |  | 1.25 | 1.31 | 1.53 | 3.10 | 2.55 | 2.55 | 1.14 | 1.19 |
| Content ratio of dye A with respect to dye B (A/B) |  | 1.69 | 1.61 | 1.57 | 0.65 | 0.36 | 0.29 | 1.09 | 0.45 |
| Content ratio of DB60 in dye A |  | 1.00 | 1.00 | 0.92 | 0.84 | 0.65 | 0.57 | 0.78 | 0.57 |
| Content ratio of DR92 in dye B |  | 0.65 | 0.57 | 1.00 | 1.00 | 1.00 | 1.00 | 0.65 | 0.57 |

TABLE 3

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
| --- | --- | --- | --- | --- | --- | --- | --- | --- | --- | --- | --- | --- |
| DB60 | 1.80 | 1.69 | 1.69 | 1.69 | 1.69 | 1.69 |  |  |  |  |  |  |
| DB165 |  |  |  |  |  |  | 0.49 | 0.49 | 0.49 | 0.49 | 0.49 | 0.49 |
| DR74 |  |  | 0.80 |  |  |  |  |  | 0.80 |  |  |  |
| DR92 | 1.80 | 1.61 |  |  |  |  | 1.30 | 1.30 |  |  |  |  |
| DR154 |  |  |  | 0.80 | 0.80 |  |  |  |  | 0.80 | 0.80 |  |
| DR191 |  |  |  |  |  | 0.80 |  |  |  |  |  | 0.80 |
| DY163 |  |  | 0.80 |  |  | 0.80 |  | 0.80 |  |  | 0.80 |  |
| DY114 | 0.80 |  |  | 0.80 |  |  | 0.80 |  |  | 0.80 |  |  |
| DO80 |  | 0.80 |  |  | 0.80 |  |  |  | 0.80 |  |  | 0.80 |
| Dispersant | 8.80 | 8.20 | 6.58 | 6.58 | 6.58 | 6.58 | 5.18 | 5.18 | 4.18 | 4.18 | 4.18 | 4.18 |
| TEG | 3 | 3 | 3 | 3 | 3 | 3 | 3 | 3 | 3 | 3 | 3 | 3 |
| MTG | 3 | 3 | 3 | 3 | 3 | 3 | 3 | 3 | 3 | 3 | 3 | 3 |
| Glycerin | 31 | 31 | 31 | 31 | 31 | 31 | 31 | 31 | 31 | 31 | 31 | 31 |

TABLE 3-continued

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| TEA | 0.4 | 0.4 | 0.4 | 0.4 | 0.4 | 0.4 | 0.4 | 0.4 | 0.4 | 0.4 | 0.4 | 0.4 |
| PELEX SSH | 1.6 | 1.6 | 1.6 | 1.6 | 1.6 | 1.6 | 1.6 | 1.6 | 1.6 | 1.6 | 1.6 | 1.6 |
| Pure water | Balance | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 | 100 |

Recording Step: Ink Applying Step

The black ink was recorded on the cloth using an ink jet printer PX-G930 (manufactured by Seiko Epson Corp.). The image resolution was set to 1,440 dpi×720 dpi.

Fixing Step: Heat Treatment Step

A steaming treatment of a textile printed material obtained through the recording step was performed using a HT steamer (HT3-550 type, manufactured by TSUJII DYEING MACHINE MANUFACTURING CO., LTD.) under the conditions described below, whereby the dye was fixed onto the cloth.

Steam temperature: 170° C.
Humidity: 100% R.H.
Treatment time: 8 minutes

Cleaning Step

The textile printed material obtained through the fixing step was cleaned, and a reduction cleaning was performed using a dye tester Turby type T (manufactured by Mathis Co., Ltd.) under the conditions described below. Thereafter, the textile printed material was dried using an iron to be obtained.

Temperature conditions: the temperature was raised from 25° C. to 85° C. at a temperature-increase rate of 2° C./min, the temperature was held at 85° C. for 10 minutes, and the temperature was lowered from 85° C. to 25° C. at a temperature-decrease rate of 3° C./min.

Stirring: a rotation speed of 800 rpm (rotation: 55 s, cycle of left rotation 55 s).

Cleaning solution: water of 150 g, laccol STA of 0.3 g (soaping agent, manufactured by Meisei Chemical Works, Ltd.), hydrosulfite of 0.15 g (manufactured by Wako Pure Chemical Industries, Ltd.) and 10 N sodium hydroxide of 0.3 g.

Evaluation of Poor Reservation of White Area

A 19 cm×25 cm solid pattern was recorded on a polyester elastomer Bilight Woven (manufactured by Boselli) of an A4 size under the conditions of an image resolution of 1,440 dpi×720 dpi, ink droplet of 22 ng per one dot and the duty of 100%, and the fixing step was performed, whereby a textile printed material was obtained. A color was measured with respect to an plain area of the textile printed material using a colorimeter Spectrolino (manufactured by GretagMacbeth) before and after the cleaning step, and a color difference ΔE in a Lab colorimetric system was calculated based on the following formula (1).

$$\Delta E = \sqrt{(L_2^* - L_1^*)^2 + (a_2^* - a_1^*)^2 + (b_2^* - b_1^*)^2} \quad (1)$$

In the formula (1), $L_1^*$, $a_1^*$ and $b_1^*$ are the value of the textile printed material before the test, and $L_2^*$, $a_2^*$ and $b_2^*$ are the value of the textile printed material after the test.

The poor reservation of white area of the obtained ΔE was evaluated according to the following criteria. The results are described in Tables 4 to 6. 1 and 2 are levels with no problems during practical use.

1: ΔE is in the range of 0 or greater to less than 5
2: ΔE is in the range of 5 or greater to less than 10
3: ΔE is in the range of 10 or greater to less than 20
4: ΔE is 20 or greater Moreover, the above-described "Duty" is a value calculated by the following formula (2).

$$\text{Duty (\%)} = \text{the number of actually recorded dots}/(\text{vertical resolution} \times \text{horizontal resolution}) \times 100 \quad (2)$$

In the formula (2), "the number of actually recorded dots" is the number of dots that are actually recorded per unit area, and a "vertical resolution" and a "horizontal resolution" are the image resolution per unit area, respectively. The duty of 100% means the maximum ink mass of a single color with respect to a pixel. Therefore, for example, in the case where the horizontal resolution is 1,440 dpi and the vertical resolution is 720 dpi, the duty shows a percentage of ink dots placed in the total partitions of 1,036,800 when one square inch is divided into 1,440 horizontally and 720 vertically.

Evaluation of Light Resistance

A gradation pattern was recorded on a polyester elastomer Brisbane (manufactured by Carvico) under the conditions of an image resolution of 1,440 dpi×720 dpi and ink droplet of 22 ng per one dot, and the fixing step and the cleaning step were performed, whereby a textile printed material was obtained. The gradation pattern, while increasing the duty by 5%, is configured with total 20 pattern from the duty 5% pattern to the duty 100% pattern, the duty difference between respective patterns is 5%. Next, the light resistance of the textile printed material was evaluated using Xenon Weather Meter XL-75s (manufactured by Suga Test Instruments Co., Ltd.). Test conditions are as follows.

Radiation temperature: 34 W/m$^2$
Tank temperature: 25° C.
BPT temperature: 38.4° C.
Humidity: 55% R.H.
Exposure energy: 28 MJ/m$^2$ A color was measured with respect to the textile printed material before and after the light resistance evaluation, and a color difference ΔE and OD retention rate in a LAB colorimetric system was calculated.

Moreover, the ΔE and the OD retention rate are represented by the following formulas (1) and (3), respectively.

$$(OD\text{ retention rate}) = 100 \times (OD\text{ value of textile printed material after the test})/(OD\text{ value of textile printed material prior to the test}) \quad (3)$$

The obtained ΔE was evaluated according to the following criteria. The results are described in Tables 4 to 6. (Dk means Optical Dentusy of Black)
1: Dk=ΔE of 1.0 part is in the range of 0 or greater to less than 3
2: Dk=ΔE of 1.0 part is in the range of 3 or greater to less than 4
3: Dk=ΔE of 1.0 part is in the range of 4 or greater to less than 5
4: Dk=ΔE of 1.0 part is 5 or greater The obtained OD retention rate was evaluated according to the following criteria. The results are described in Tables 4 to 6.
1: Dk=OD retention rate of 1.0 part is 95% or greater
2: Dk=OD retention rate of 1.0 part is in the range of 90% or greater to less than 95%
3: Dk=OD retention rate of 1.0 part is in the range of 85% or greater to less than 90%
4: Dk=OD retention rate of 1.0 part is 85% or less 1 and 2 are levels with no problems for outdoor use, respectively.

Color Evaluation

A solid pattern was recorded on a polyester cloth Raso Tivano (manufactured by Boselli) under the conditions of an image resolution of 1,440 dpi×720 dpi, ink droplet of 22 ng per one dot and the duty 100%, and the fixing step and the cleaning step were performed, whereby a textile printed material was obtained. Then, a color was measured using a colorimeter Spectrolino (manufactured by GretagMacbeth), and C* in a LAB colorimetric system was calculated based on the following formula (4).

$$C^* = \sqrt{(a^*)^2 + (b^*)^2} \quad (4)$$

The color of the obtained C* was evaluated according to the following criteria. 1 to 4 can be used as the black ink. The results are described in Tables 4 to 6.
1: C* is less than 2
2: C* is in the range of 2 or greater to less than 5
3: C* is in the range of 5 or greater to less than 10
4: C* is in the range of 10 or greater to less than 15
5: C* is 15 or greater

TABLE 4

|  |  | Example 1 | Example 2 | Example 3 | Example 4 | Example 5 | Example 6 | Example 7 | Example 8 | Example 9 |
|---|---|---|---|---|---|---|---|---|---|---|
| Light resistance | ΔE | 1 | 1 | 1 | 1 | 2 | 1 | 1 | 2 | 1 |
|  | OD retention rate | 1 | 1 | 1 | 1 | 2 | 2 | 2 | 1 | 1 |
| Color |  | 1 | 1 | 1 | 3 | 3 | 3 | 3 | 2 | 2 |
| Poor reservation of white area |  | 1 | 1 | 1 | 1 | 2 | 2 | 2 | 1 | 1 |

TABLE 5

|  |  | Example 10 | Example 11 | Example 12 | Example 13 | Example 14 | Example 15 | Example 16 | Example 17 |
|---|---|---|---|---|---|---|---|---|---|
| Light resistance | ΔE | 1 | 2 | 1 | 1 | 1 | 1 | 1 | 2 |
|  | OD retention rate | 1 | 1 | 1 | 1 | 1 | 2 | 1 | 2 |
| Color |  | 2 | 2 | 2 | 3 | 1 | 2 | 1 | 1 |
| Poor reservation of white area |  | 1 | 1 | 1 | 1 | 1 | 2 | 1 | 1 |

TABLE 6

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|---|
| Light resistance | ΔE | 3 | 4 | 4 | 4 | 4 | 1 | 3 | 4 | 4 | 4 | 4 | 1 |
|  | OD retention rate | 2 | 3 | 1 | 1 | 2 | 1 | 2 | 3 | 1 | 1 | 2 | 1 |
| Color |  | 3 | 3 | 3 | 3 | 3 | 3 | 3 | 3 | 3 | 3 | 3 | 3 |
| Poor reservation of white area |  | 1 | 1 | 1 | 1 | 1 | 4 | 2 | 2 | 2 | 2 | 1 | 4 |

As clearly seen from Tables 1 to 6, it was clarified that in the black ink for ink jet textile printing according to the invention, the poor reservation of white area is suppressed, and light resistance is excellent.

In addition, it was clarified that by a predetermined configuration of disperse dyes (A), (B) and (C) which are included in the black ink for ink jet textile printing according to the invention, the black color in which color is suppressed (C* is low) can be obtained.

On the other hand, as clearly seen from Tables 1 to 6, it was clarified that in the black ink for ink jet textile printing according to Comparative Examples, sufficient light resistance is not obtained, or the poor reservation of white area is unlikely to be generated.

The invention is not limited to the above-described embodiments and various modifications are possible. For example, the invention includes substantially the same configuration (for example, a configuration in which functions, methods, and results are the same or a configuration in which the purposes or effects are the same) as the configuration described in the embodiments. Further, the invention includes a configuration in which a part which is not substantial in the configuration described in the embodiments is replaced. In addition, the invention includes configurations exhibiting the same action effects as the configurations described in the embodiments or configurations which can achieve the same object. In addition, the invention includes a configuration made by adding a known technology to the configuration described in the embodiments.

The entire disclosure of Japanese Patent Application No. 2013-051376, filed Mar. 14, 2013 is expressly incorporated by reference herein.

What is claimed is:

1. A black ink for ink jet textile printing comprising:
   a disperse dye (A);
   a disperse dye (B);
   a disperse dye (C);
   water; and
   an organic solvent,
   wherein the disperse dye (A) is at least one of C.I. Disperse Blue 60 and C.I. Disperse Blue 165,
   wherein the disperse dye (B) is at least one of C.I. Disperse Red 92 and C.I. Disperse Red 154, and
   wherein the disperse dye (C) is C.I. Disperse Yellow 163.

2. The black ink for ink jet textile printing according to claim 1,
   wherein a content ratio of the C.I. Disperse Red 92 with respect to a content of the disperse dye (B) is 0.6 or greater on a mass basis.

3. The black ink for ink jet textile printing according to claim 1,
   wherein a content ratio of the C.I. Disperse Blue 60 with respect to a content of the disperse dye (A) is 0.6 or greater on a mass basis.

4. The black ink for ink jet textile printing according to claim 1,
   wherein the content ratio of the disperse dye (A) with respect to a content of the disperse dye (C) is in the range of 0.5 to 3.0 on a mass basis, and
   wherein the content ratio of the disperse dye (B) with respect to the content of the disperse dye (C) is in the range of 1.0 to 3.0 on a mass basis.

5. The black ink for ink jet textile printing according to claim 4,
   wherein the content ratio of the disperse dye (A) with respect to the content of the disperse dye (B) is in the range of 0.3 to 1.5 on a mass basis.

6. The black ink for ink jet textile printing according to claim 1,
   wherein a total content of the disperse dye (A), the disperse dye (B) and the disperse dye (C) is in the range of 1.5% by mass to 7.0% by mass.

7. A textile printing method,
   wherein a textile printed material is obtained by applying the black ink for ink jet textile printing according to claim 1 to a cloth.

8. A textile printing method,
   wherein a textile printed material is obtained by applying the black ink for ink jet textile printing according to claim 2 to a cloth.

9. A textile printing method,
   wherein a textile printed material is obtained by applying the black ink for ink jet textile printing according to claim 3 to a cloth.

10. A textile printing method,
    wherein a textile printed material is obtained by applying the black ink for ink jet textile printing according to claim 4 to a cloth.

11. A textile printing method,
    wherein a textile printed material is obtained by applying the black ink for ink jet textile printing according to claim 5 to a cloth.

12. A textile printing method,
    wherein a textile printed material is obtained by applying the black ink for ink jet textile printing according to claim 6 to a cloth.

13. The textile printing method according to claim 7, comprising:
    discharging the black ink for ink jet textile printing according to claim 1 to apply the ink to the cloth utilizing an ink jet recording apparatus.

14. The textile printing method according to claim 13, comprising:
    applying a pretreatment agent to the cloth prior to applying the ink thereto; heat-treating the cloth after applying the ink thereto; and cleaning the heat-treated cloth.

* * * * *